(12) United States Patent
Chen

(10) Patent No.: US 9,569,028 B2
(45) Date of Patent: Feb. 14, 2017

(54) OPTICAL TOUCH SYSTEM, METHOD OF TOUCH DETECTION, METHOD OF CALIBRATION, AND COMPUTER PROGRAM PRODUCT

(71) Applicant: Wistron Corporation, New Taipei (TW)

(72) Inventor: Yu-Yen Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 130 days.

(21) Appl. No.: 14/058,294

(22) Filed: Oct. 21, 2013

(65) Prior Publication Data

US 2014/0160075 A1 Jun. 12, 2014

(30) Foreign Application Priority Data

Dec. 11, 2012 (TW) .............................. 101146703 A

(51) Int. Cl.
*G06F 3/041* (2006.01)
*G06F 3/042* (2006.01)

(52) U.S. Cl.
CPC ........... *G06F 3/0416* (2013.01); *G06F 3/0428* (2013.01)

(58) Field of Classification Search
CPC .............................. G06F 3/0416; G06F 3/0428
See application file for complete search history.

(56) References Cited

U.S. PATENT DOCUMENTS

| 6,100,538 | A * | 8/2000 | Ogawa ...................... 250/559.29 |
| 8,203,764 | B2 | 6/2012 | King et al. | |
| 2009/0058833 | A1 | 3/2009 | Newton | |
| 2011/0090177 | A1 | 4/2011 | Chuang et al. | |
| 2011/0102377 | A1 * | 5/2011 | Liao et al. ..................... 345/175 |
| 2011/0169727 | A1 * | 7/2011 | Akitt ..................... G06F 3/0421 345/156 |

(Continued)

FOREIGN PATENT DOCUMENTS

| CN | 102163104 | 8/2011 |
| TW | 201122966 | 7/2011 |

OTHER PUBLICATIONS

"Office Action of Taiwan Counterpart Application", issued on Oct. 8, 2014, p. 1-p. 14.

(Continued)

*Primary Examiner* — Liliana Cerullo
(74) *Attorney, Agent, or Firm* — Jianq Chyun IP Office

(57) ABSTRACT

An optical touch system including a reflecting unit, at least one light emitting module, at least one image detecting module, and a processing unit is provided. The reflecting unit, the light emitting module, and the image detecting module are disposed beside a base plane. The light emitting module provides a first detecting light and a second detecting light with different intensities by turns. The first detecting light and the second detecting light are transmitted to the reflecting unit. The image detecting module generates a first signal and a second signal. When an object approaches or touches the base plane, at least a portion of the first detecting light and a portion of the second detecting light are obstructed by the object. The processing unit determines a position of the object. Additionally, a method of touch detection, a method of calibration, and a computer program product are also provided.

19 Claims, 14 Drawing Sheets

(56) References Cited

U.S. PATENT DOCUMENTS

2012/0032921 A1    2/2012  Lin et al.
2012/0162144 A1*   6/2012  Fahraeus et al. ............. 345/178
2012/0256882 A1*  10/2012  Christiansson et al. ...... 345/175

OTHER PUBLICATIONS

"Office Action of China Counterpart Application", issued on May 4, 2016, with English translation thereof, p. 1-p. 21.

* cited by examiner

First instructions: providing at least one first detecting light and at least one second detecting light by turns, wherein the first detecting light and the second detecting light are transmitted in front of the base plane, and the first detecting light and the second detecting light are reflected and then transmitted in front of the base plane. — PG100

Second instructions: detecting the reflected first detecting light and the reflected second detecting light, and generating a first signal corresponding to the first detecting light and a second signal corresponding to the second detecting light. — PG200

Third instructions: determining a position of the object with respect to the base plane according to the first signal and the second signal. — PG300

FIG. 8

OPTICAL TOUCH SYSTEM, METHOD OF TOUCH DETECTION, METHOD OF CALIBRATION, AND COMPUTER PROGRAM PRODUCT

CROSS-REFERENCE TO RELATED APPLICATION

This application claims the priority benefit of Taiwan application serial no. 101146703, filed on Dec. 11, 2012. The entirety of the above-mentioned patent application is hereby incorporated by reference herein and made a part of this specification.

BACKGROUND OF THE INVENTION

Field of Invention

The invention relates to an optical touch system, a method of touch detection, a method of calibration and a computer program product.

Description of Related Art

In recent years, due to the convenience and intuitiveness on controlling, touch electronic products are favored by consumers and have become the mainstream in the market. In the resistive touch screen, the capacitive touch screen and the rear projection touch screen that are conventionally used in the electronic products, the capacitive touch screen has the best touch-sensing performance, but the manufacturing cost of the capacitive touch screen is the highest as well. Further, with the increase of the size of the touch screen, the manufacturing cost is also increased, so the application of the capacitive touch screen is limited.

To find an alternative for the capacitive touch screen, an optical touch screen employing an optical lens for detecting touch positions has been proposed due to various advantages including low cost and high accuracy. Since the optical touch screen is more advantageous in a competitive market, it is also a choice for the large size touch panel.

Another type of the optical touch screen employs a plurality of optical lenses or reflective frames disposed at edges of the screen for capturing images of user's fingers during the touch operation on the screen. The position of the shadow caused by the light shading effect of the finger in the captured image can be analyzed for calculating the precise position of the touch point. In addition, the cost of configuring the reflective frames is much lower than the cost of configuring the plurality of optical lenses, so using the reflective frames is advantageous on lowering the cost. Generally speaking, to cover the whole display panel in the illuminating range of the light emitting unit, the illumination intensity of the light emitting unit is required to maintain in a sufficient intensity. However, under such condition, when a touch object, such as a user's finger, is close to the light source, an image sensor may receive the reflected light reflected by the touch object in high intensity. Therefore, the light detector is overexposed to the reflected light, and a disablement or an error on detection occurs. On the other hand, if the light intensity of the light emitting unit is reduced to avoid detecting the high intensity reflected light, then the touch object on the region of the display panel which is away from the light emitting unit can be hardly detected. As a result, how to precisely detect the position of the touch object is still one of the problems for developing the optical touch system.

SUMMARY OF THE INVENTION

The invention discloses an optical touch system which precisely determines an action of an object approaching or touching a base plane.

The invention discloses a method of touch detection which precisely determines an action of an object approaching or touching the base plane.

The invention discloses a computer program product which precisely determines an action of an object approaching or touching the base plane.

The invention discloses a method of calibration which is configured to calibrate an optical touch system in order to improve the precision of the optical touch system.

An embodiment of the invention provides an optical touch system configured to determine an action of an object approaching or touching a base plane. The optical touch system includes a reflecting unit, at least one light emitting module, at least one image detecting module and a processing unit. The reflecting unit is disposed beside the base plane. The light emitting module is disposed beside the base plane and provides a first detecting light and a second detecting light with different intensities by turns, where the first detecting light and the second detecting light are transmitted to the reflecting unit through a front of the base plane. The image detecting module is disposed beside the base plane. The reflecting unit reflects the first detecting light and the second detecting light and causes the first detecting light and the second detecting light to be transmitted to the image detecting module through the front of the base plane. The image detecting module generates a first signal corresponding to the first detecting light and a second signal corresponding to the second detecting light. When the object approaches or touches the base plane, at least a portion of the first detecting light and at least a portion of the second detecting light are obstructed by the object. The processing unit determines a position of the object with respect to the base plane according to the first signal and the second signal.

An embodiment of the invention provides a method of touch detection configured to determine an action of an object approaching or touching a base plane. The method of touch detection includes: providing at least one first detecting light and at least one second detecting light by turns and causing the first detecting light and the second detecting light to be transmitted though a front of the base plane; reflecting the first detecting light and the second detecting light and causing the first detecting light and the second detecting light to be transmitted through the front of the base plane; detecting the reflected first detecting light and the reflected second detecting light and generating a first signal corresponding to the first detecting light and a second signal corresponding to the second detecting light, wherein when the object approaches or touches the base plane, the object obstructs at least a portion of the first detecting light and at least a portion of the second detecting light; and determining a position of the object with respect to the base plane according to the first signal and the second signal.

An embodiment of the invention provides a computer program product in a computer readable medium for determining an action of an object approaching or touching a base plane. The computer program product includes first instructions, second instructions and third instructions. The first instructions are configured to provide at least one first detecting light and at least one second detecting light by turns, wherein the first detecting light and the second detecting light are transmitted in a front of the base plane, and the first detecting light and the second detecting light are reflected and then transmitted in the front of the base plane. The second instructions are configured to detect the reflected first detecting light and the reflected second detecting light and to generate a first signal corresponding to the first detecting light and a second signal corresponding to the second detecting light. When the object approaches or touches the base plane, at least a portion of the first detecting light and at least a portion of the second detecting light are obstructed by the object. The third instructions are configured to determine a position of the object with respect to the base plane according to the first signal and the second signal.

An embodiment of the invention provides a method of calibration including: (a) providing an optical touch system, the optical touch system including a reflecting unit, at least one light emitting module and at least one image detecting module, wherein the reflecting unit and the light emitting module are disposed beside a base plane, the light emitting module provides a first detecting light and a second detecting light, the first detecting light and the second detecting light are transmitted to the reflecting unit through a front of the base plane, the image detecting module is disposed beside the base plane, the reflecting unit reflects the first detecting light and the second detecting light and causes the first detecting light and the second detecting light to be transmitted to the image detecting module through the front of the base plane, and the image detecting module generates a first signal corresponding to the first detecting light and a second signal corresponding to the second detecting light; (b) causing the light emitting module to provide the first detecting light; (c) when an object is distant from the base plane, regarding the first signal generated by the image detecting module as a first background intensity waveform signal; (d) generating a first threshold intensity waveform signal according to the first background intensity waveform signal, wherein a signal intensity of the first threshold intensity waveform signal is lower than the signal intensity of the first background strength waveform signal; (e) causing the object to approach or to touch the base plane at a first position and determining whether there is a portion of the signal intensity of the first signal generated by the image detecting module lower than the first threshold intensity waveform signal; (f) if the determination result of the step (e) shows that there is the portion of the signal intensity of the first signal generated by the image detecting module lower than the first threshold intensity waveform signal, then an intensity of the first detecting light being defined as a first calibrated intensity; if the determination result of the step (e) shows that there is no portion of the signal intensity of the first signal generated by the image detecting module lower than the first threshold intensity waveform signal, the intensity of the first detecting light being lowered, and the steps (c)~(e) being repeated until the determination result of the step (e) shows that there is the portion of the signal intensity of the first signal lowered than the first threshold intensity waveform signal, wherein when the determination result of the step (e) shows that there is the portion of the signal intensity of the first signal lower than the first threshold intensity waveform signal, the intensity of the first detecting light is defined as the first calibrated intensity.

Based on the above description, the optical touch system, the method of touch detection and the computer program product in the embodiment of the invention provide the first detecting light and the second detecting light with different intensities by turns to detect the position of the object approaching or touching the base plane. The detecting light with higher intensity is suitable for detecting the far object and the detecting light with lower intensity is suitable for detecting the close object, so as to avoid determining the positions of the far object and the close object in error. The method of calibration in the embodiments of the invention calibrates the light intensity of the first detecting light, so that the action of the object in closing or touching the base plane generates sufficient signal change to effectively improve the accuracy of the optical touch system.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 8 is a command flowchart showing a computer program product according to an embodiment.

DESCRIPTION OF THE PREFERRED EMBODIMENTS

Figure 1:
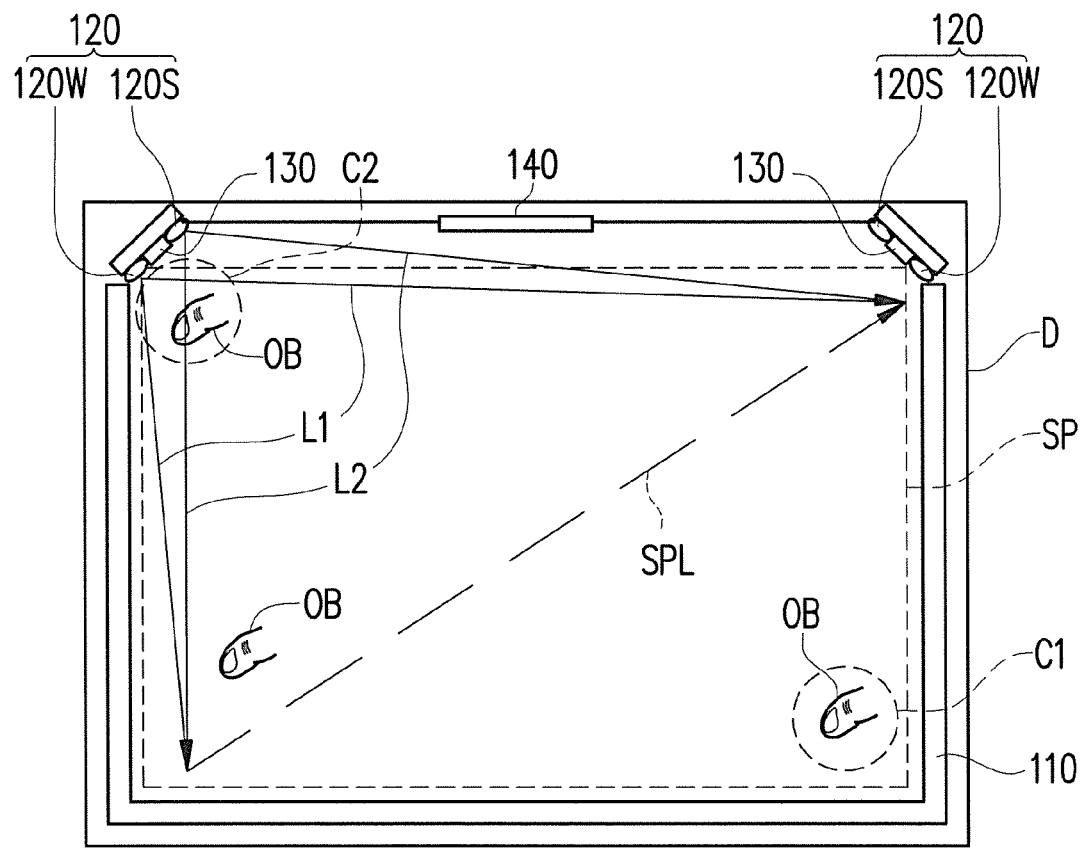
FIG. 1 is a schematic diagram showing an optical touch system according to an embodiment.

FIG. 1 is a schematic diagram showing an optical touch system according to an embodiment. Referring to FIG. 1, the optical touch system 100 in the present embodiment can be configured to determine an action of an object OB approaching or touching a base plane SP. The optical touch system 100 further includes a display apparatus D, and the base plane SP is a display surface of the display apparatus D. Alternatively, in other embodiments, the base plane SP can be a surface of a touch platform different from the display apparatus D, and the touch platform, for example, can be a touch plate (e.g. the touch plate on a keyboard of a laptop or the touch plate on other portable electronic devices), a desktop surface, a wall surface or any other surface that can be touched or be approached by the object OB. The object OB, for example, is a user's finger, a stylus pen or any other object suitable for touch control. The optical touch system 100 includes a reflecting unit 110, at least one light emitting module 120 (a plurality of light emitting modules 120 are illustrated in FIG. 1 as an example), at least one image detecting module 130 (a plurality of image detecting modules 130 are illustrated in FIG. 1 as an example) and a processing unit 140. The reflecting unit 100 is disposed beside the base plane SP. The reflecting unit 100 is reflective frames illustrated in FIG. 1, and the light emitting module 120 includes a light source, such as a light emitting diode (LED) or an incandescent lamp, which is suitable for emitting detecting light. The image detecting module includes an image sensor such as a charge couple device (CCD) or a complementary metal oxide semiconductor (CMOS) sensor. The sensor of the image detecting module is, for example, a line sensor (i.e. a one-dimensional image sensor). However, in other embodiments, the sensor of the image detecting module can also be a two-dimensional image sensor.

The light emitting module 120 is disposed beside the base plane SP and provides a first detecting light L1 and a second detecting light L2 with different intensities by turns. In the present embodiment, the intensity of the first detecting light L1 is, for example, smaller than the intensity of the second detecting light L2. The first detecting light L1 and the second detecting light L2 can be alternately provided, and the switch frequency and the time period for light emitting can be changed according to the practical requirement. The first detecting light L1 and the second detecting light are transmitted to the reflecting unit 110 through a front of the base plane SP. As illustrated in FIG. 1, the illumination ranges of the first detecting light L1 and the second detecting light L2 are at least partially overlapped and cover at least a portion of the base plane SP. The image detecting module 130 is disposed beside the base plane SP, and the reflecting unit 110 reflects the first detecting light L1 and the second detecting light L2 and causes the first detecting light L1 and the second detecting light L2 to be transmitted to the image detecting module 130 through the front of the base plane SP.

The image detecting module 130 generates a first signal S1 corresponding to the first detecting light L1 and a second signal S2 corresponding to the second detecting light L2. When the object OB approaches or touches the base plane SP, the object OB obstructs at least a portion of the first detecting light L1 and at least a portion of the second detecting light L2. Then, the processing unit 140 determines the position of the object OB with respect to the base plane SP according to the first signal S1 and the second signal S2. The first signal S1 and the second signal S2 are illustrated and explained in the following description.

Figure 2:
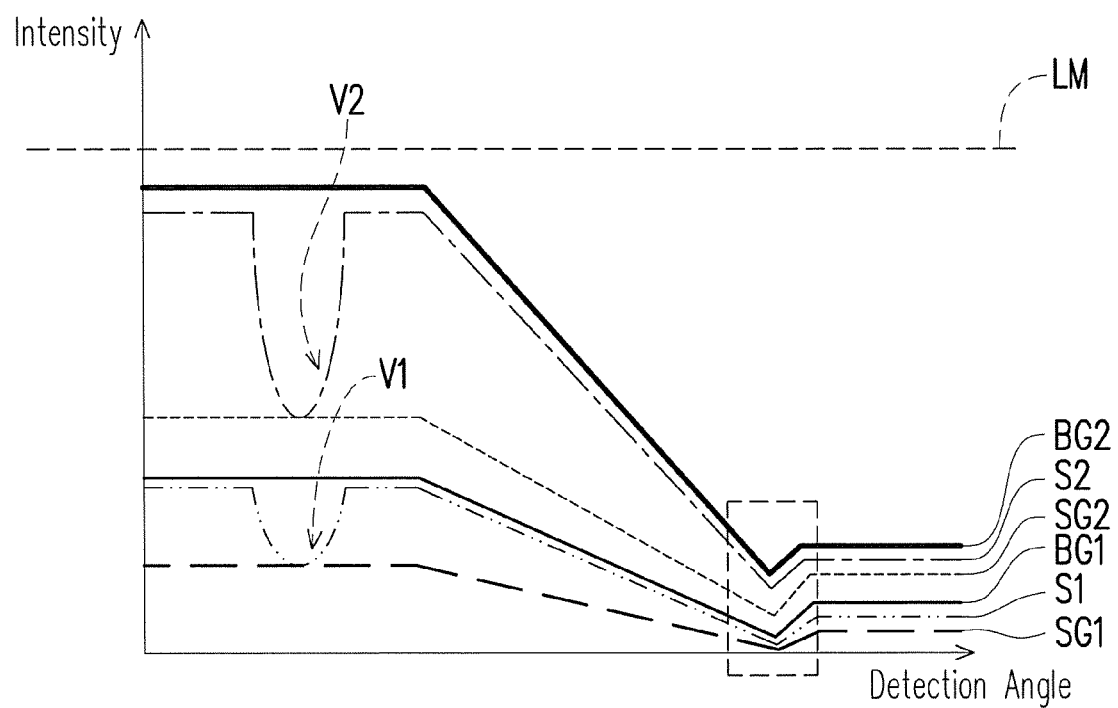
FIG. 2 is a schematic diagram showing signals detected by the image detecting module according to the embodiment shown in FIG. 1.
Figure 3:
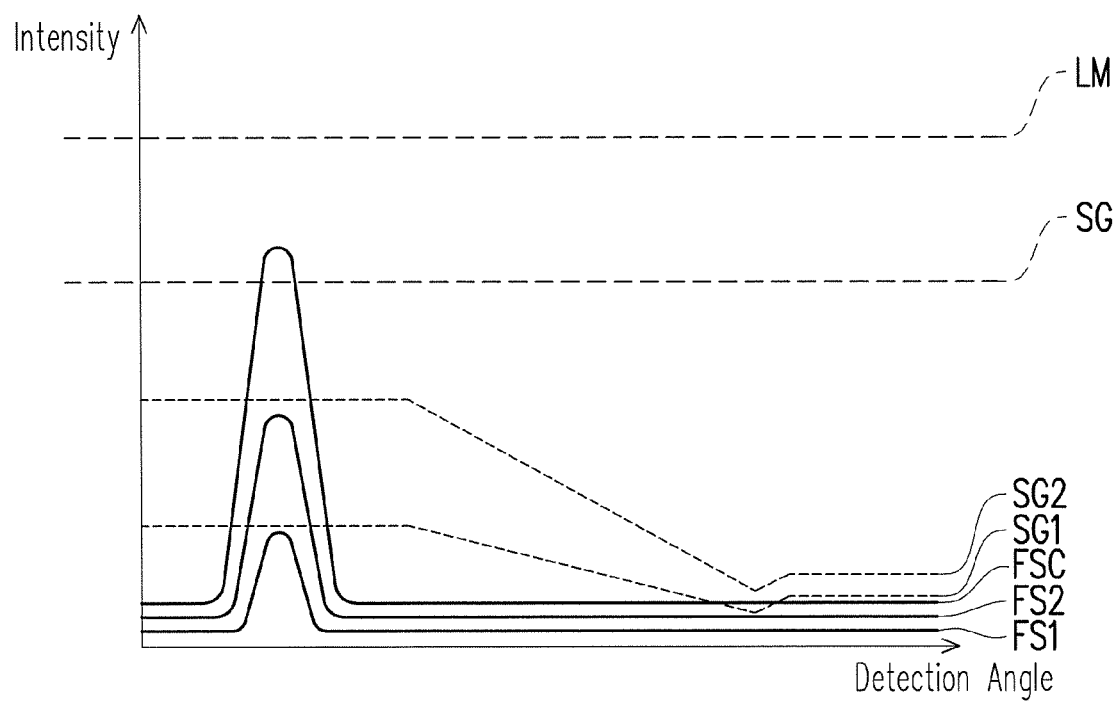
FIG. 3 is a schematic diagram showing a first characteristic signal and a second characteristic signal according to the embodiment shown in FIG. 1.

FIG. 2 is a schematic diagram showing signals detected by the image detecting module according to the embodiment shown in FIG. 1. FIG. 3 is a schematic diagram showing a first characteristic signal and a second characteristic signal according to the embodiment shown in FIG. 1. Please referring to FIGS. 1~3, specifically speaking, in the present embodiment, when the object OB is distant from the base plane SP, the image detecting module 130 generates a first background signal BG1 corresponding to the first detecting light L1 and a second background signal BG2 corresponding to the second detecting light L2. In the present embodiment, frames of the display apparatus D have a certain thickness, and the first detecting light L1 and the second detecting light L2 have certain opening angles along the direction perpendicular to the base plane SP. In the present embodiment, when the first detecting light L1 and the second detecting light L2 approach the frame of the display apparatus D, the illumination range of the detecting light along the direction perpendicular to the base plane SP can be designed to be equal or larger than the thickness of the frame, so that the function of optical touch detection is well executed. However, the invention is not limited to this. When the object OB is away from the base plane SP to the degree over the thickness of frames of the display apparatus D, or when the object OB is not in the illumination range of the first detecting light L1 and the second detecting light L2 limited by the opening angle along the direction perpendicular to the base plane SP, the object OB is defined as distant from the base plane SP in the present embodiment. However, in other embodiments, the illumination range of the detecting light can be designed to change the sensitivity of the optical touch detection according to the practical requirement, so the invention is no limited thereto.

In addition, the first background signal BG1 and the second background signal BG2 are illustrated in FIG. 2, wherein the horizontal axis represents the detection angle of the image detecting module 130, and the range of the detection angle along a reference line SPL can cover the base plane SP. The vertical axis represents the intensity of the signal detected by the image detecting module 130, which corresponds to the light intensity detected by the image detecting module 130. The maximum value of the light intensity that could be received by the image detecting module 130 is a threshold value LM (i.e. the dot line shown in FIG. 2). The recesses of the first background signal BG1 and the second background signal BG2 (i.e. the area enclosed by dot frames in FIG. 2) correspond to the corner C1 of the base plane SP in FIG. 1. Since the corner C1 is the farthest away from the light emitting module 120, so the light intensity around the corner C1 is the weakest, and the recesses are performed correspondingly in the first background signal BG1 and the second background signal BG2. When the object OB approaches or touches the base plane SP, the object OB obstructs at least a portion of the first detecting light L1 and at least a portion of the second detecting light L2, so that the first signal S1 and the second signal S2 (i.e. dot lines shown in FIG. 2) are detected by the image detecting module 130.

Next, the processing unit 140 calculates a difference between the first background signal BG1 and the first signal S1 to obtain a first characteristic signal FS1, and the processing unit 140 also calculates a difference between the first background signal BG2 and the second signal S2 to obtain a second characteristic signal FS2 (as shown in FIG. 3). Also, the processing unit 140 determines whether the first characteristic signal FS1 and the second characteristic signal FS2 meet a predetermined condition. For example, the predetermined condition can be that the summing-up signal of the first characteristic signal FS1 and the second characteristic signal FS2 is over the threshold signal SG. If the summing-up signal exceeds the threshold signal SG, the processing unit 140 determines that the object OB is approaching or touching the base plane SP. To be more specific, the processing unit 140 generates a processing signal FSC related to the first signal S1 and the second signal S2, and the processing signal FSC is used for determining the position of the object OB with respect to the base plane SP. Specifically speaking, the processing unit 140 obtains the processing signal FSC (shown in FIG. 3) by adding the first characteristic signal FS1 with the second characteristic signal FS2, and the processing unit 140 determines whether the processing signal FSC exceeds the threshold signal SG (shown in FIG. 3). The threshold signal SG is adjusted according to the practical requirement. When the processing signal FSC exceeds the threshold signal SG, the processing unit 140 determines the object OB approaching or touching the base plane SP, and the processing unit 140 also determines the position of the object OB with respect to the base plane SP according to the position on the image detecting module 130 corresponding to the portion of the intensities of the processing signal FSC exceeding a predetermined range. In this way, computational loading can be reduced, and the computation time is also shortened to improve the efficiency of the optical touch system 100.

Further, please referring to FIGS. 1 to 3, for example, the predetermined condition can be signals where the intensities of the signals are respectively half the intensities of the first background signal BG1 and half the intensities of the second background signal BG2. To be more specific, when a recess area V1 of the first signal S1 where the intensity is dropped due to the obstruction of the object OB is lower than a signal having intensities which are respectively half the intensities of the first background signal BG1, the processing unit 140 determines that the object OB approaching or touching the base plane SP. Or, when a recess area V2 of the second signal S2 where the intensity is dropped due to the obstruction of the object OB is lower than a signal having intensities which are respectively half the intensities of the first background signal BG1, the processing unit 140 determines that the object OB approaching or touching to the base plane SP. In other words, as illustrated in FIG. 3, when the first characteristic signal FS1 is larger than the first threshold signal SG1 or when the second characteristic signal FS2 is larger than the second threshold signal SG2, the processing unit 140 determines that the object OB approaching or touching the base plane SP. That is to say, the processing unit 140 can generate the processing signal FSC related to the first signal S1 and the second signal S2 to determine whether the object OB approaches or touches the base plane SP. Alternatively, the processing unit 140 can respectively determine the positions of the object OB according to the first signal S1 and the second signal S2, and compare those positions to determine whether the object OB approaches or touches to the base plane SP.

Figure 4A:
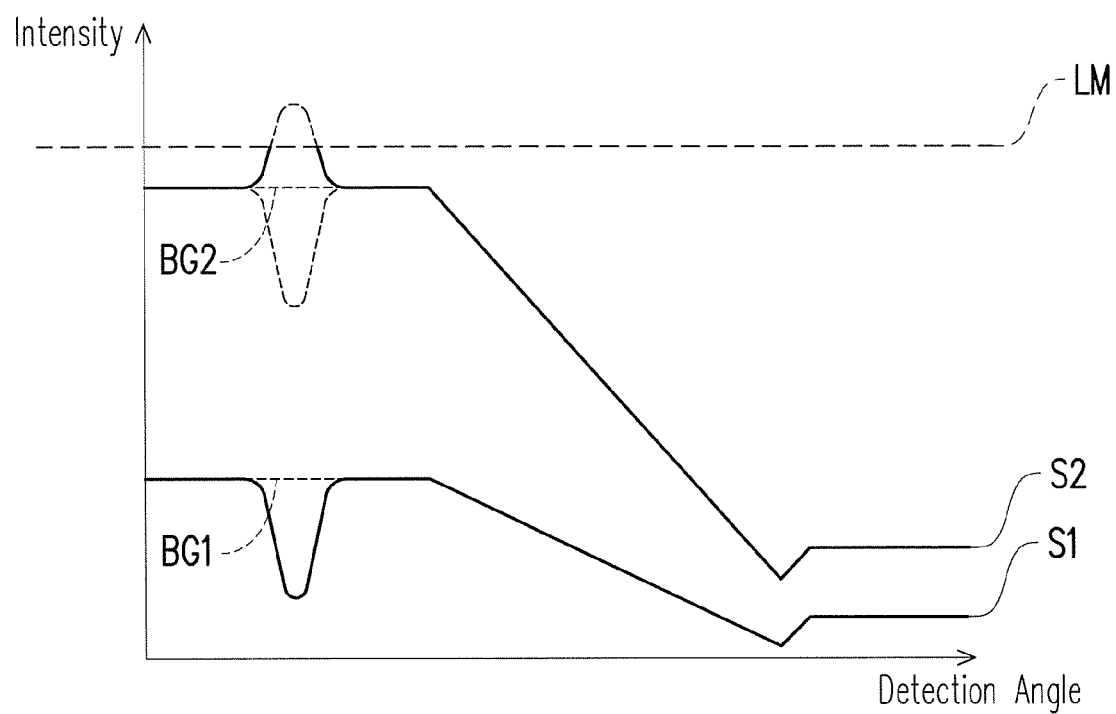
FIG. 4A is a schematic diagram showing signals of a touch point detected by the image detecting module according to the embodiment shown in FIG. 1.
Figure 4B:
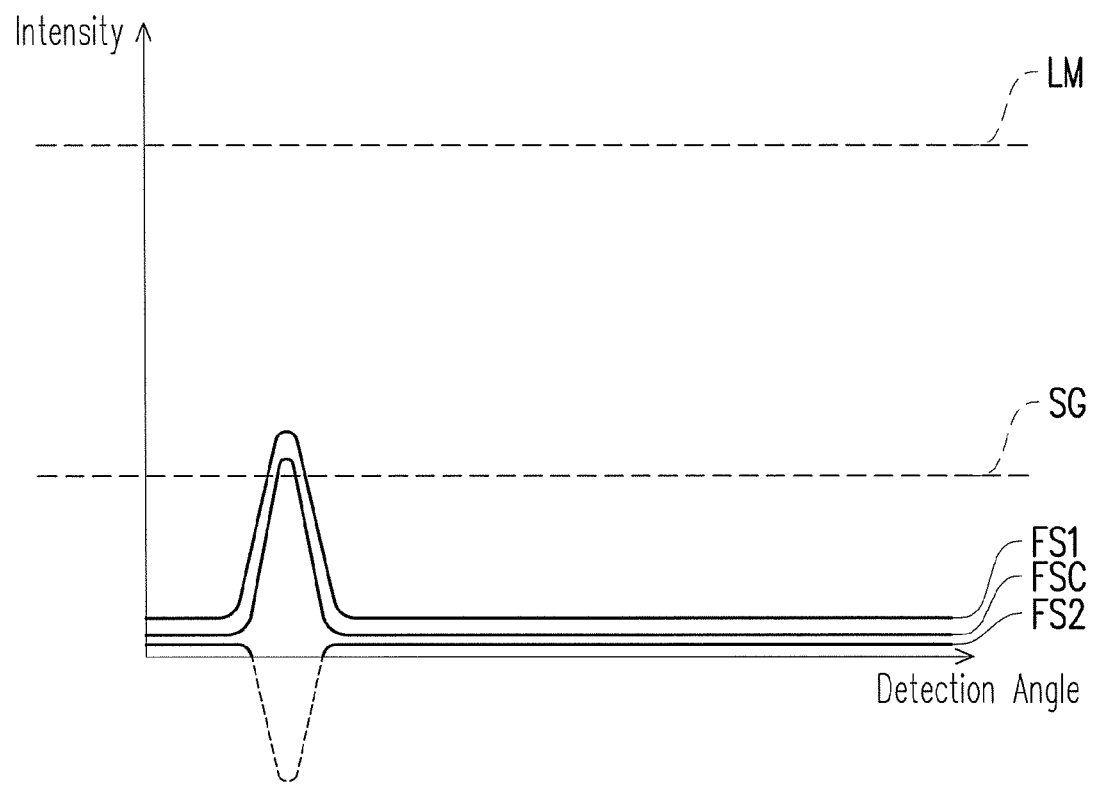
FIG. 4B is a schematic diagram of subtracting a background signal form a signal shown in FIG. 4A.
Figure 5A:
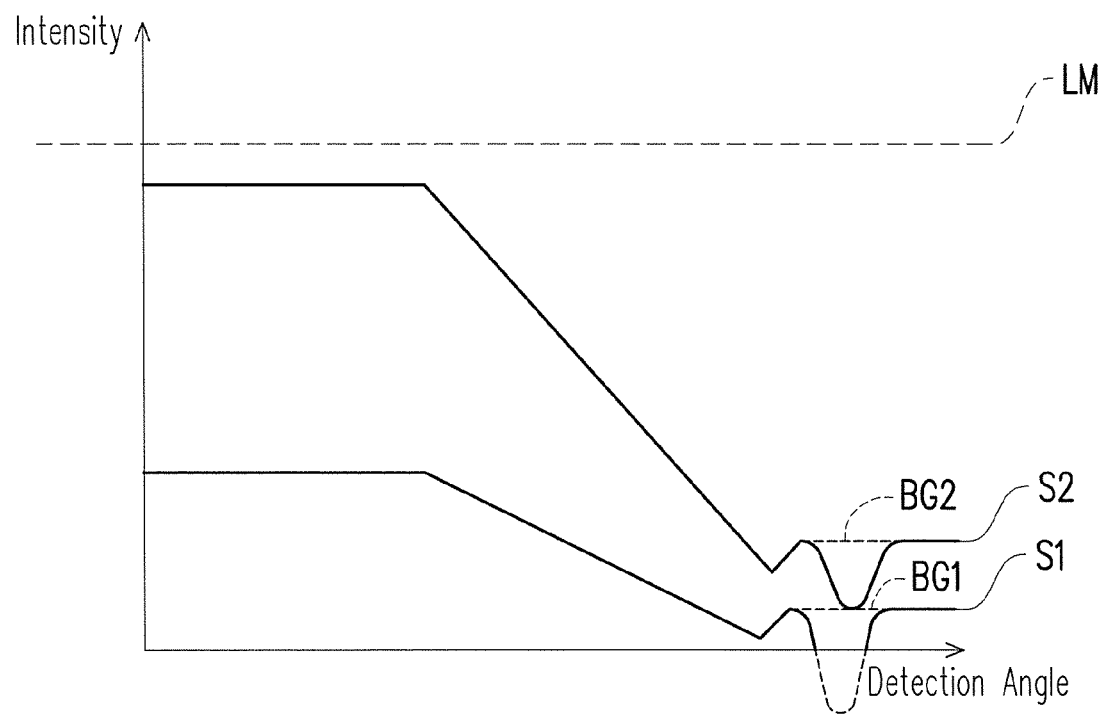
FIG. 5A is a schematic diagram showing signals of a touch point detected by the image detecting module according to the embodiment shown in FIG. 1.
Figure 5B:
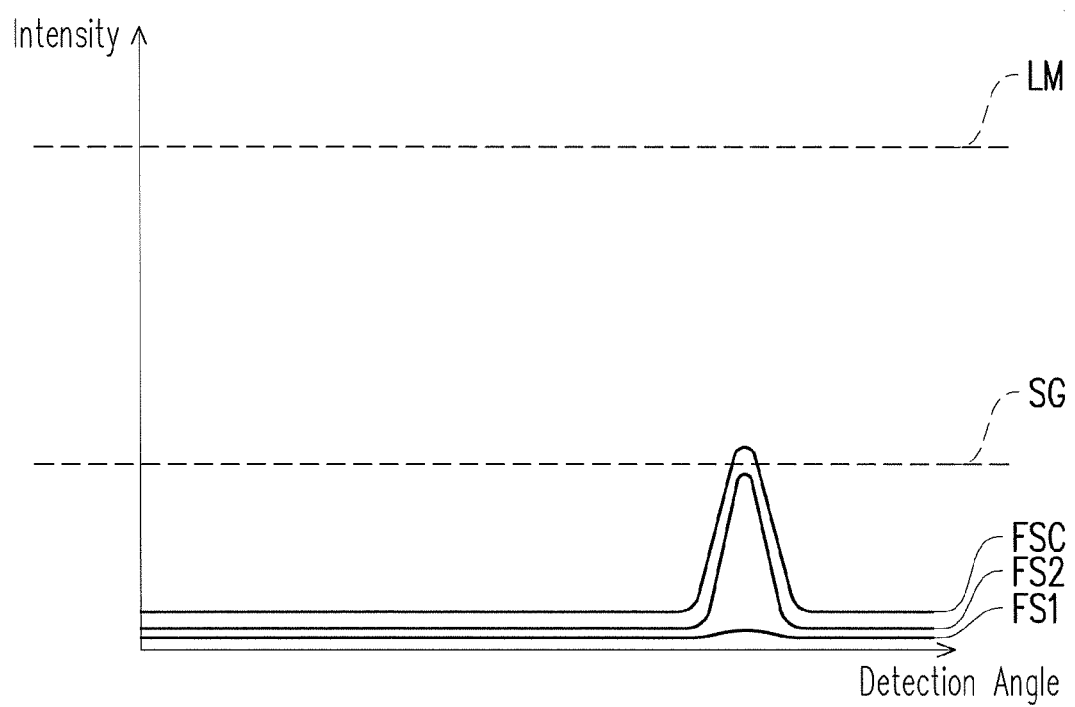
FIG. 5B is a schematic diagram of subtracting a background signal form a signal shown in FIG. 5A.

FIG. 4A and FIG. 5A are schematic diagrams showing signals of touch points detected by the image detecting module according to the embodiment shown in FIG. 1. FIG. 4B is a schematic diagram of subtracting a background signal form a signal shown in FIG. 4A. FIG. 5B is a schematic diagram of subtracting a background signal form a signal shown in FIG. 5A. Please refer to FIGS. 1 to 5B, under an overexposure situation or an underexposure situation, the object OB may be too close to or too far away from the light emitting module 120 and the image detecting module 130, so that an error in detection or detection incapability occurs. For example, if the object OB is too close to the light emitting module 120 and the image detecting module 130, most of the second detecting light L2 with higher intensity is easily being reflected by the object OB and detected by the image detecting module 130, so that the second signal S2 is changed. The protrusion area of the second signal S2 shown in FIG. 4 represents that the object OB on the corresponding position reflects the second detecting light L2, so that parts of partial intensities of the second signal S2 exceed the threshold value LM which indicates the maximum intensity that can be received by the image detecting module 130. Therefore, the second signal S2 is in an overexposure situation, and an error or incapability in detecting the position of the object OB occurs. On the other hand, if the object OB is too far away from the light emitting module 120 and the image detecting module 130, the first detecting light L1 with lower intensity is hardly to illuminate the object OB sufficiently, so the reflected light reflected to the image detecting module 130 is also weak, and that leads to the weak first signal S1. Therefore, the underexposure situation happens, and an error or incapability in detecting the position of the object OB occurs. However, as shown in FIGS. 1~3, the processing unit 140 is employed to calculate the first characteristic signal FS1 and the second characteristic signal FS2. Therefore, under the situation shown in FIGS. 4A and 4B, the processing unit 140 compares the processing signal FSC, which is obtained by adding the first characteristic signal FS1 with the second characteristic signal FS2, with the predetermined threshold signal SG. If the processing signal FSC exceeds the predetermined threshold signal SG, the processing unit 140 determines that the object OB approaches or touches the base plane SP. However, when the intensity of the second characteristic signal FS2 is low or nearly zero (the condition shown in FIG. 4B), the processing unit 140 is also possible to employ only the first signal S1 which is less affected for calculating the first characteristic signal FS1 in order to determine the position of the object OB. At the same time, under the situation illustrated in FIGS. 5A and 5B, the processing unit 140 compares the processing signal FSC, which is obtained by adding the first characteristic signal FS1 with the second characteristic signal FS2, with the predetermined threshold signal SG. If the processing signal FSC exceeds the predetermined threshold signal SG, then the object OB is determined to be approaching or touching the base plane SP. However, when the intensity of the first characteristic signal FS1 is low or nearly zero, the processing unit 140 is also possible to employ only the second signal S2 which is less affected for calculating the second characteristic signal FS2 in order to determine the position of the object OB. That is to say, when the object OB is too close to the light emitting module 120 and the image detecting module 130, the situation of the overexposure occurs due to the second detecting light L2 which has the higher intensity. In this case, the processing unit 140 can still employ the first detecting light L1 with the lower intensity to generate the first signal S1 which is less affected to determine the position of the object OB. On the other hand, if the object OB is too far away from the light emitting module 120 and the image detecting module 130, the first detecting light L1 with lower intensity is hardly to illuminate the object OB sufficiently. In this case, the processing unit 140 can employ the second detecting light L2 with the higher intensity to generate the second signal S2 which is less affected so as to determine the position of the object OB. Moreover, when the first signal S1 and the second signal S2 are fine, the processing unit 140 determines the position of the object OB according to one of the first signal S1 and the second signal S2 or both of the first signal S1 and the second signal S2, so as to improve the accuracy of the optical touch system 100.

To be more specific, the light emitting module includes a first light source 120S and a second light source 120W, where the first light source 120S and the second light source 120W respectively emit the first detecting light L1 and the second detecting light L2. However, in other embodiments, the light emitting module 120 may include only one light source where the light intensity of the light source is adjustable. In the present embodiment, the processing unit 140 may cause times of providing the first detecting light L1 and the second detecting light L2 by the light emitting module 120 to respectively coordinate with times of generating the first signal S1 and the second signal S2 by the image detecting module 130. For example, first, the processing unit 140 can provide the first detecting light L1. After the first signal S1 is generated by the image detecting module 130, the processing unit 140 provides the second detecting light L2 until after the second signal S2 is generated by the image detecting module 130. Then, the first detecting light L1 is provided again. By repeating the process of alternately providing the first detecting light L1 and the second detecting light L2, the first signal S1 and the second signal S2 can be obtained under the situation that the first detecting light L1 and the second detecting light L2 are free to interfere with each other. Also, the efficiency and the accuracy of the touch detection of the optical touch system 100 can be improved. The light emitting module 120 can have different cooperation mode of the first detecting light L1 and the second detecting light L2 with the first signal S1 and the second signal S2, so the aforementioned cooperation method is only described to explain the present embodiment, but the invention is not limited thereto.

Figure 6:
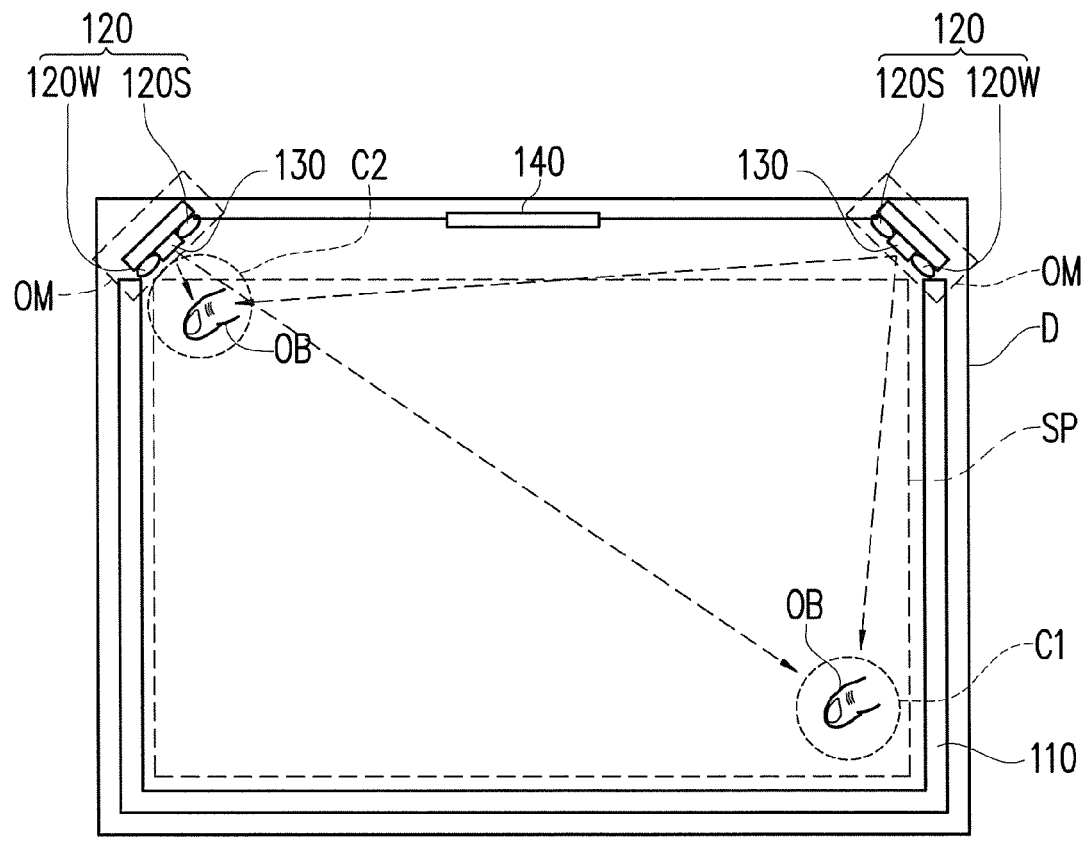
FIG. 6 is a schematic diagram showing an optical touch system according to another embodiment shown in FIG. 1.

FIG. 6 is a schematic diagram showing an optical touch system according to another embodiment shown in FIG. 1. Referring to FIG. 6, the at least one light emitting module 120 can be a plurality of light emitting modules 120, and the at least one image detecting module 130 can be a plurality of image detecting modules 130 as well. Each of the light emitting module 120 and one of the image detecting modules 130 correspondingly form an optical module OM. In the left and right optical modules OM, the light emitting module 120 located at the top left side of the display apparatus D corresponds to the image detecting module 130 located at the top left side of the display apparatus D, and the light emitting module 120 located at the top right side of the display apparatus D corresponds to the image detecting module 120 located at the top right side of the display apparatus D. Each of the light emitting modules 120 corresponds to one first light source 120S and one second light source 120W. The numbers of the light emitting module 120, the image detecting module 130 and the optical module OM are only an example for explaining the present embodiment, and the invention is mot limited herein. Therefore, a triangulation method can be employed by the processing unit 140 to deal with the first signals S1 and the second signals S2 from the left and right optical modules OM, so as to obtain a two-dimensional coordinate of the object OB with respect to the base plane SP. Even when the number of the light emitting units is fewer in the optical touch system 100, the position of the object OB on the base plane SP can still be obtained precisely by using the first detecting light L1 and the second detecting light L2 with different intensity, so that the manufacturing cost of the optical touch system 100 can be lowered without harming the accuracy of the touch detection.

Figure 7:
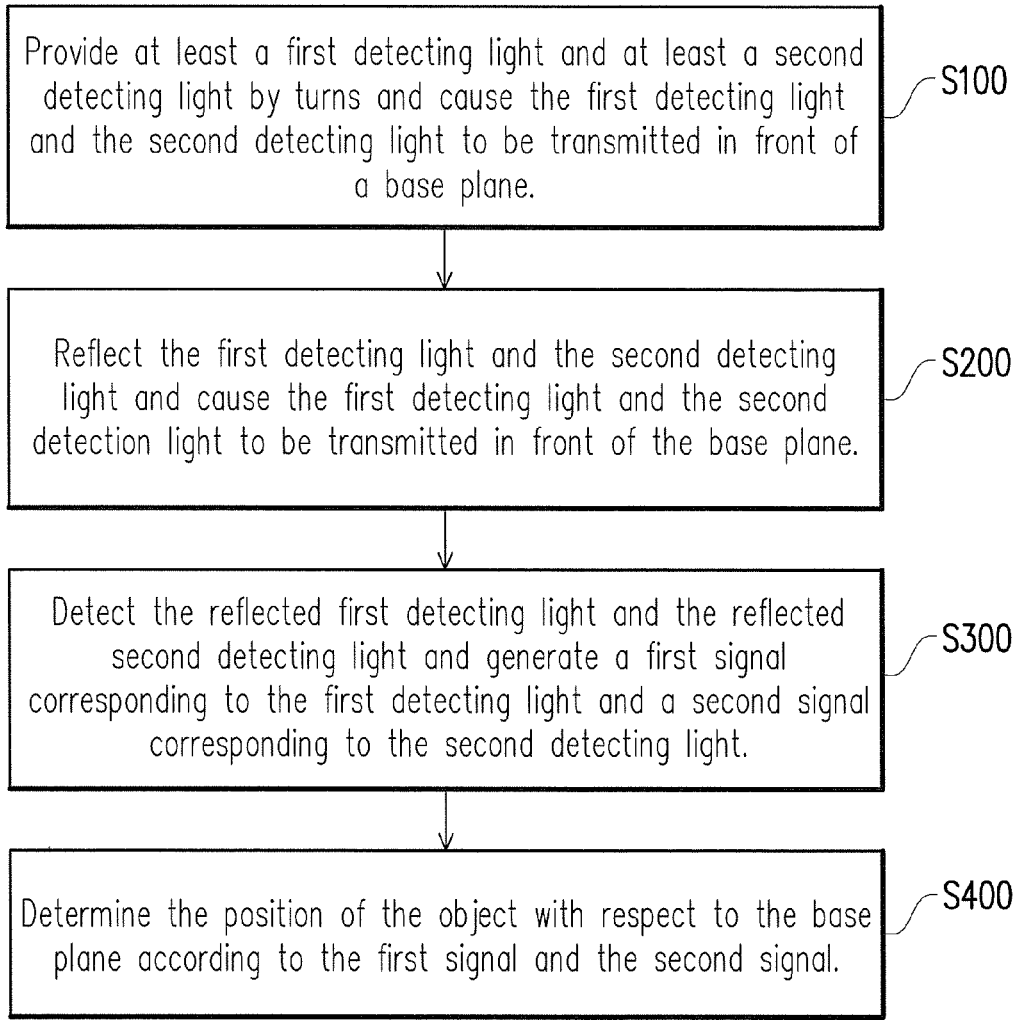
FIG. 7 is a flowchart showing a method of touch detection according to an embodiment.

FIG. 7 is a flowchart showing a method of touch detection according to an embodiment. Referring to FIG. 7, the method of touch detection is employed to determine an action of the object OB approaching or touching the base plane SP. The system employed for executing the method of touch detection can be known by referring to the optical touch system shown in FIGS. 1~6. The method of touch detection includes the following steps. In step S100, at least a first detecting light L1 and at least a second detecting light L2 are provided by turns, and the first detecting light L1 and the second detecting light L2 are caused to be transmitted in front of the base plane SP. In step S200, the first detecting light L1 and the second detecting light L2 are reflected, and the first detecting light L1 and the second detecting light L2 are caused to be transmitted in front of the base plane SP. In step S300, the reflected first detecting light L1 and the reflected second detecting light L2 are detected, and a first signal S1 corresponding to the first detecting light L1 and a second signal S2 corresponding to the second detecting light L2 are generated, wherein when the object OB approaches or touches the base plane SP, the object OB obstructs at least a portion of the first detecting light L1 and at least a portion of the second detecting light L2. In step S400, the position of the object OB with respect to the base plane SP is determined according to the first signal S1 and the second signal S2. Similar to the embodiment shown in FIG. 1~6, the method of touch detection employs the first detecting light L1 and the second detecting light L2 with different intensity for respectively detecting the object OB, so as to avoid the situation that the position of the object OB with respect to the base plane SP is hardly to determine due to the overexposure of the first signal S1 or the weak second signal S2 which respectively occur because the object OB is too close to or too far from the light emitting module 120 and the image detecting module 130.

To be more specific, the step of determining the position of the object OB with respect to the base plane SP according to the first signal S1 and the second signal S2 includes: generating a processing signal FSC related to the first signal S1 and the second signal S2; and determining the position of the object OB with respect to the base plane SP according to the processing signal FSC. The apparatus and the detailed description for executing the method described above can be known by referring to the embodiment shown in FIG. 1~3, so it is not repeated herein.

In addition, the method of touch detection further includes generating a first background signal BG1 corresponding to the first detecting light L1 and a second background signal BG2 corresponding to the second detecting light L2 when the object OB is distant away from the base plane SP. Also, the step of determining the position of the object OB with respect to the base plane SP according to the first signal S1 and the second signal S2 includes: calculating a difference between the first background signal BG1 and the first signal S1 to obtain a first characteristic signal FS1; calculating a difference between the second background signal BG2 and the second signal S2 to obtain a second characteristic signal FS2; and determining whether the first characteristic signal FS1 and the second characteristic signal FS2 satisfy a predetermined condition. If the first characteristic signal FS1 and the second characteristic signal FS2 satisfy the predetermined condition, the object OB is determined to be approaching or touching the base plane SP. The apparatus and the detailed description for executing the method described above can be known by referring to the embodiment shown in FIG. 1~3, so it is not repeated herein.

Moreover, the step of determining whether the first characteristic signal FS1 and the second characteristic signal FS2 satisfy a predetermined condition includes: adding the first characteristic signal FS1 with the second characteristic signal FS2 to obtain a processing signal FSC; and determining whether the processing signal FSC satisfies the predetermined condition. If the processing signal FSC satisfies the predetermined condition, the object OB is determined to be approaching or touching the base plane SP. Further, the step of determining whether the processing signal FSC satisfies the predetermined condition includes: determining whether at least a portion of the intensity of the processing signal FSC exceeds a predetermined range. If yes, then the object OB is determined to be approaching or touching the base plane SP. Also, the step of determining the position of the object OB with respect to the base plane SP according to the first signal S1 and the second signal S2 includes: determining the position of the object OB with respect to the base plane SP according to the position on the image detecting module 130 corresponding to the portion of the intensities of the processing signal FSC exceeding the predetermined range. As the result, the computation loading is further reduced (i.e. no computation respectively for the first characteristic signal FS1 and the second characteristic signal FS2), so as to improve the efficiency of determining the position of the object OB, and the convenience of the usage can be improved. The apparatus and the detailed description for executing the method described above can be known by referring to the embodiment shown in FIG. 1~3, so it is not repeated herein.

In addition, the method of touch detection further includes: coordinating times of providing the first detecting light L1 and the second detecting light L2 respectively with times of generating the first signal S1 and the second signal S2. For example, first, the first detecting light L1 is provided. After the first signal S1 is generated by the image detecting module 130, the second detecting light L2 is provided until after the second signal S2 is generated by the image detecting module 130. Then, the first detecting light L1 is provided again. By repeating the process of alternately providing the first detecting light L1 and the second detecting light L2, the first signal S1 and the second signal S2 can be obtained under the situation that the first detecting light L1 and the second detecting light L2 are free to interfere with each other. Also, the efficiency and the accuracy of the touch detection can be improved. The apparatus and the detailed description for executing the method described above can be known by referring to the embodiment shown in FIG. 1~6, so it is not repeated herein.

Referring to FIG. 1~6, the at least one first detecting light L1 is a plurality of first detecting lights L1, and the at least one second detecting light L2 is a plurality of second detecting lights L2, and the method of touch detection further includes using the triangulation method to deal with the first signals S1 corresponding to the first detecting lights L1 and the second signals S2 corresponding to the second detecting lights L2, so as to obtain a two-dimensional coordinate of the object OB with respect to the base plane SP. The apparatus and the detailed description for executing the method described above can be known by referring to the embodiment shown in FIG. 6, so it is not repeated herein.

FIG. 8 is a command flowchart showing a computer program product according to an embodiment. Referring to FIG. 8, the computer program product is adapted for being stored in a computer readable medium, and the computer program product is configured to determine the action of the object OB approaching or touching the base plane SP. The computer program product may be installed in the processing unit 140 shown in FIG. 1 for executing the following instructions. The computer program product includes first instructions (PG100), which are configured to provide at least a first detecting light L1 and at least a second detecting light L2 by turns, wherein the first detecting light L1 and the second detecting light L2 are transmitted in front of the base plane SP, and the first detecting light L1 and the second detecting light L2 are reflected and then transmitted in front of the base plane SP; second instructions (PG 200), which are configured to detect the reflected first detecting light L1 and the reflected second detecting light L2, and to generate a first signal S1 corresponding to the first detecting light L1 and a second signal S2 corresponding to the second detecting light L2, wherein when the object OB approaches or touches the base plane SP, at least a portion of the first detecting light L1 and the at least a portion of the second detecting light L2 are obstructed by the object OB; and third instructions (PG 300), which are configured to determine the position of the object OB with the respect to the base plane SP according to the first signal S1 and the second signal S2. The first detecting light L1 and the second detecting light L2 are reflected by the reflecting unit 110 as shown in FIG. 1. The instructions in the computer program product are executed and processed by the processing unit 140 shown in FIG. 1. The first, the second and the third described above are only used for labeling, so as to conveniently explain the present embodiment, but the sequence of executing the instructions is not limited thereto. The apparatus and the detailed description for executing the instructions described above can be known by referring to the embodiment shown in FIGS. 1~6, so it is not repeated herein.

The third instructions include: instructions for generating the processing signal FSC related to the first signal S1 and the second signal S2; and instructions for determining the position of the object OB with respect to the base plane SP according to the processing signal FSC. The first characteristic signal FS1 is added with the second characteristic signal FS2 and used for determining by the instructions of the processing signal FSC in the embodiment shown in FIGS. 1~3. However, in other embodiments, the instructions of the processing signal FSC can have different algorithms according to the practical requirement. In this way, computational loading can be reduced, so the efficiency of the optical touch system 100 can be improved.

Specifically speaking, the computer program product includes instructions for generating a first background signal BG1 corresponding to the first detecting light L1 and a second background signal BG2 corresponding to the second detecting light L2 when the object OB is distant from the base plane SP. The third instructions also include: instructions for calculating the difference between the first background signal BG1 and the first signal S1 to obtain a first characteristic signal FS1; instructions for calculating the difference between the second background signal BG2 and the second signal S2 to obtain a second characteristic signal FS2; and instructions for determining whether the first characteristic signal FS1 and the second characteristic signal FS2 satisfy a predetermined condition. If the first characteristic signal FS1 and the second characteristic signal FS2 satisfy the predetermined condition, the object OB is determined to be approaching or touching the base plane SP. The executing sequence of the instructions for calculating the first background signal BG1 and the first signal S1 and the instructions for calculating the second background signal BG2 and the second signal S2 is only an example for explaining the present embodiment, so the executing sequence of the instructions can be varied according to the practical requirement.

Moreover, the instructions for determining whether the first characteristic signal FS1 and the second characteristic signal FS2 correspond to a predetermined condition include: instructions for adding the first characteristic signal FS1 with the second characteristic signal FS2 to obtain a processing signal FSC; and instructions for determining whether the processing signal FSC satisfy the predetermined condition. If the processing signal FSC satisfy the predetermined condition, the object OB is determined to be approaching or touching the base plane SP. The apparatus and the detailed description for executing the instructions described above can be known by referring to the embodiment shown in FIGS. 1~3, so it is not repeated herein.

To be more specific, in the present embodiment, the instructions for determining whether the processing signal FSC satisfies the predetermined condition include: determining whether there is at least a portion of the intensities represented by the processing signal FSC exceeding a predetermined range. If yes, the object OB is determined to be approaching or touching the base plane SP by the instructions. Further, the third instructions include: instructions for determining the position of the object OB with respect to the base plane SP according to the position on the image detecting module 130 corresponding to the portion of the intensities of the processing signal FSC which exceeds the predetermined range. Therefore, the actual position of the object OB can be induced by analyzing the processing signal FSC. The apparatus and the detailed description for executing the instructions described above can be known by referring to the embodiment shown in FIGS. 1~3, so it is not repeated herein.

In addition, the instructions of the computer program product can also be employed in the optical touch system 100' having the plurality of optical modules OM which are described in the embodiment shown in FIG. 6. The computer program product further includes instructions coordinating times of providing the first detecting light L1 and the second detecting light L2 respectively with times of generating the first signal S1 and the second signal S2. For example, first, the instructions control the light emitting unit 120 to provide the first detecting light L1. After the first signal S1 is generated at the image detecting module 130, the instructions control the light emitting unit 120 to provide the second detecting light L2 until after the second signal S2 is generated by the image detecting module 130. Then, the instructions control the light emitting unit 120 to provide the first detecting light L1 again. By repeating the process of alternately providing the first detecting light L1 and the second detecting light L2, the first signal S1 and the second signal S2 can be obtained under the situation that the first detecting light L1 and the second detecting light L2 are free to interfere with each other. However, in other embodiments, the instructions may also provide other cooperation method for coordinating times of providing the first detecting light L1 and the second detecting light L2 respectively with times of generating the first signal S1 and the second signal S2.

The at least one first detecting light L1 may be a plurality of first detecting lights L1 and the at least one second detecting light L2 may be a plurality of second detecting lights L2, and the computer program product further includes instructions using the triangulation method to deal with the first signals S1 corresponding to the first detecting lights L1 and the second signals S2 corresponding to the second detecting lights L2, so as to obtain the two-dimensional coordinate of the object OB with respect to the base plane SP. The apparatus and the detailed description for executing the instructions described above can be known by referring to the embodiment shown in FIG. 6, so it is not repeated herein.

Figure 9A:
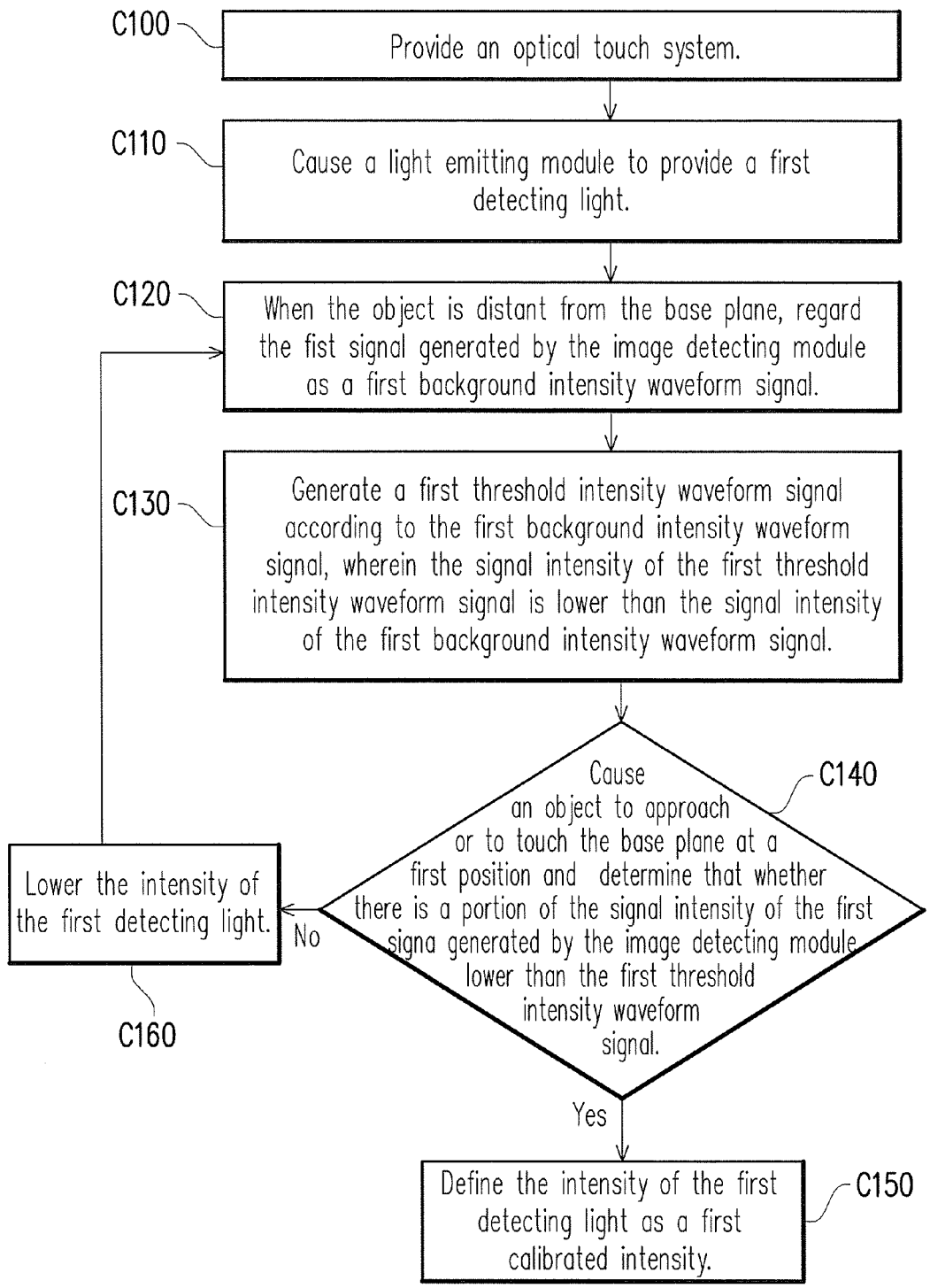
FIG. 9A is a flowchart showing a method of calibration according to an embodiment.
Figure 9B:
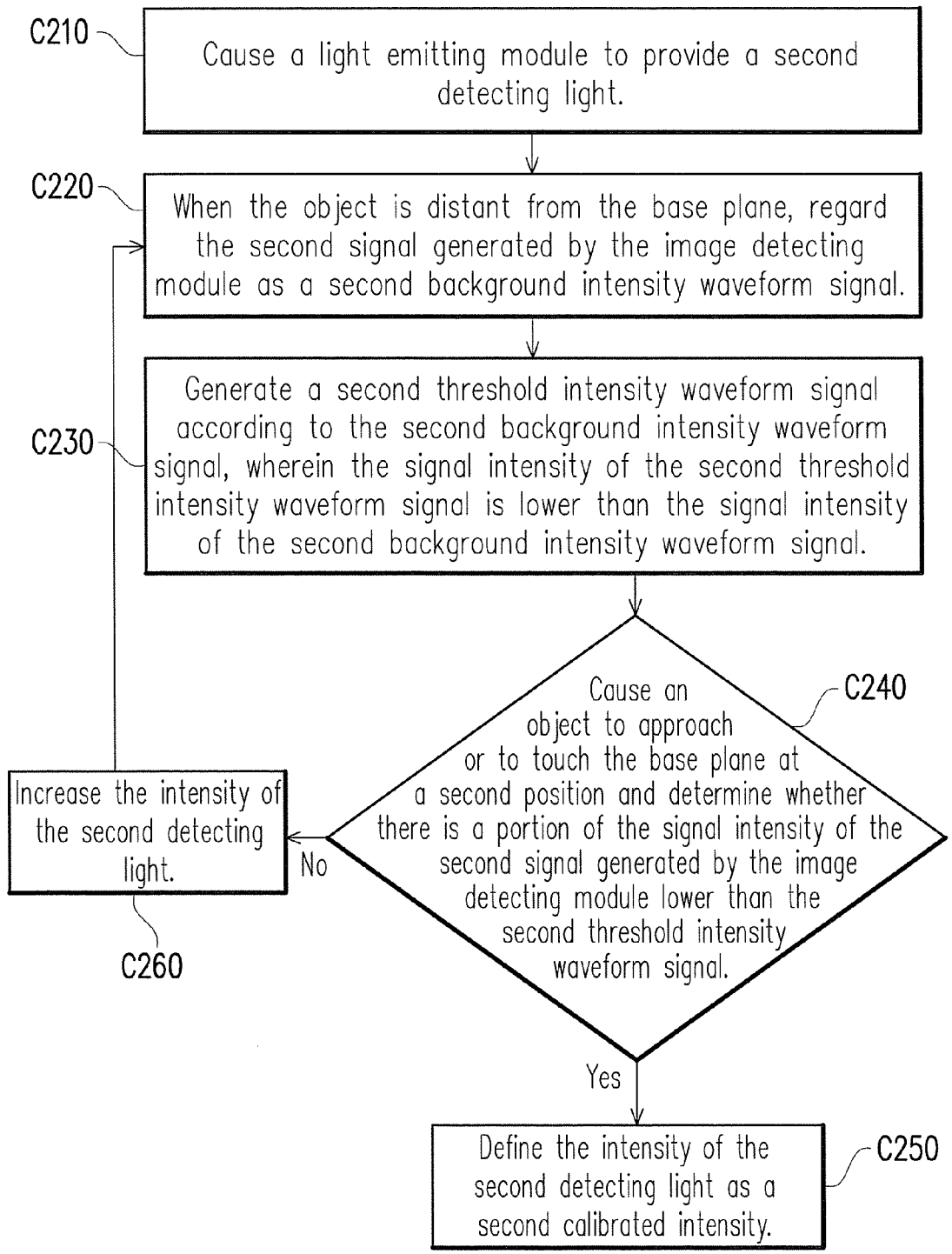
FIG. 9B is a detailed flowchart showing a method of calibration according to an embodiment.
Figure 10:
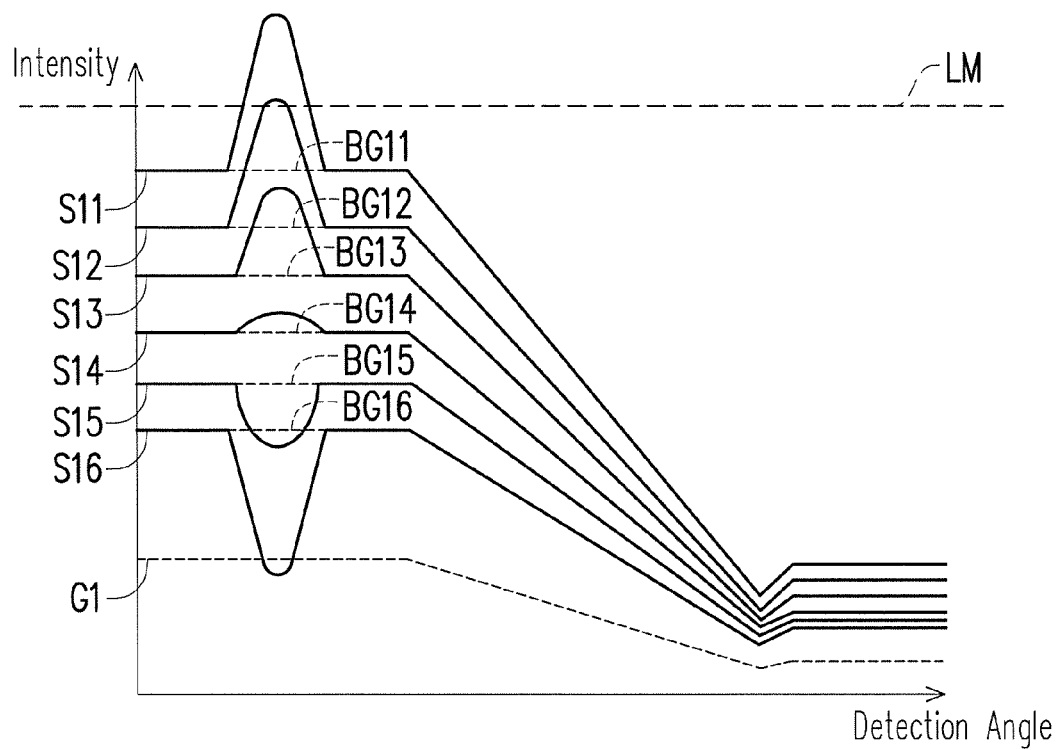
FIG. 10 is a schematic diagram showing a signal comparison of a calibration method according to an embodiment shown in FIG. 9A.
Figure 11:
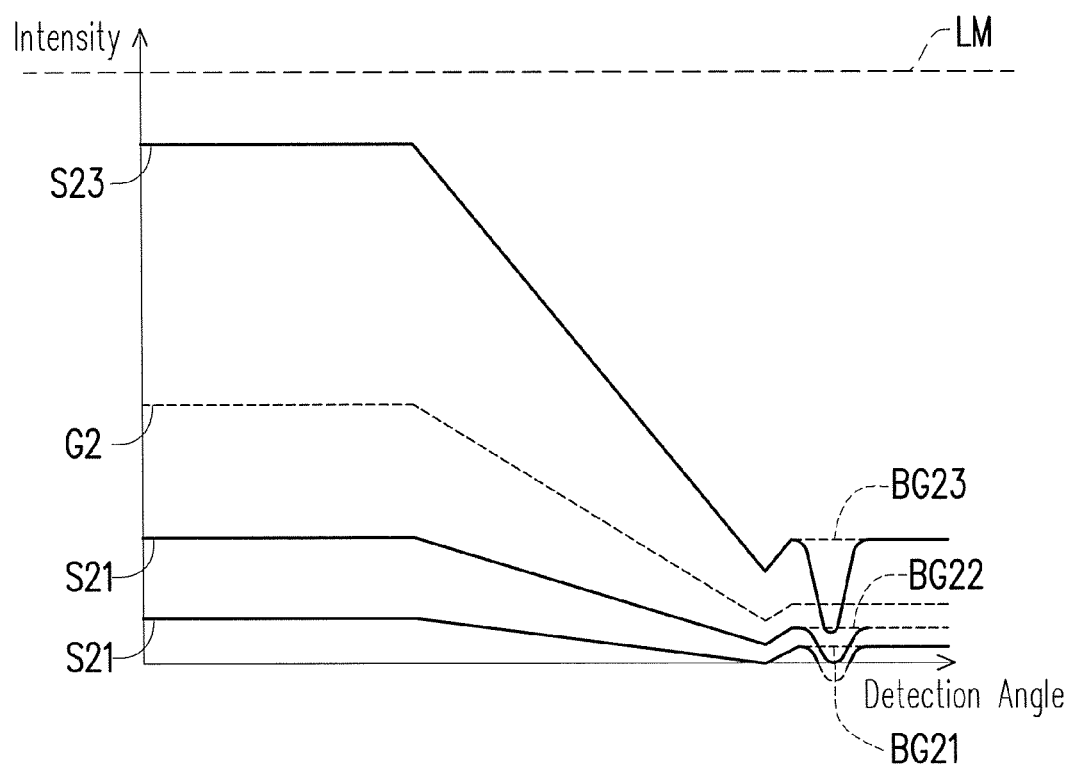
FIG. 11 is a schematic diagram showing a signal comparison of a calibration method according to an embodiment shown in FIG. 9B.

FIG. 9A is a flowchart showing a method of calibration according to an embodiment. FIG. 9B is a detailed flowchart showing a method of calibration according to an embodiment. FIG. 10 is a schematic diagram showing a signal comparison of a method of calibration according to an embodiment shown in FIG. 9A. FIG. 11 is a schematic diagram showing a signal comparison of a method of calibration according to an embodiment shown in FIG. 9B. Please referring to FIG. 9A, the system for executing the calibration method can be known by referring to the embodiment shown in FIGS. 1~6. The calibration method includes the following steps. In step C100, an optical touch system 100 is provided. In step C110, a first detecting light L1 is provided by the light emitting module 120. In step C120, when the object OB is distant away from the base plane SP, the first signal S1 generated by the image detecting module 130 is regarded as a first background intensity waveform signal BG1. In step C130, a first threshold intensity waveform signal G1 is generated according to the first background intensity waveform signal BG1, wherein the signal intensity of the first threshold intensity waveform signal G1 is lower than the signal intensity of the first background intensity waveform signal BG1. In step C140, an object OB is caused to approach or to touch the base plane SP at a first position P1, and whether there is a portion of the signal intensities of the first signal S1 lower than the first threshold intensity waveform signal G1 is determined. If the determination result of the step C140 shows that there is the portion of the signal intensity of the first signal S1 lower than the first threshold intensity waveform signal G1, then the intensity of the first detecting light L1 is defined as a first calibrated intensity in step C150. However, if the determination result of the step C140 shows that there is no portion of the signal intensities of the first signal S1 lower than the first threshold intensity waveform signal G1, the intensity of the first detecting light L1 is lowered in step C160, and then the steps C120~C140 are repeated until the determination result in step C140 shows that there is a portion of the signal intensities of the first signal S1 lower than the first threshold intensity waveform signal G1, wherein when the determination result in step C140 shows that there is a portion of the signal intensities of the first signal S1 lower than the first threshold intensity waveform signal G1, the intensity of the first detecting light L1 is defined as the first calibrated intensity. The apparatus for executing steps C100 and C110 can be known by referring to optical touch system 100' in the embodiment shown in FIG. 6. The first background intensity waveform signal BG1 described in step C120 is varied correspondingly to the intensity of the first detecting light L1. Generally speaking, when the light intensity of the first detecting light L1 is high, the intensity of the first background intensity waveform signal BG1 is also increased. As the light intensity of the first detecting light L1 is reduced, the intensity of the first background intensity waveform signal BG1 is also reduced. For example, referring to FIG. 10, the first signals S11~S16 respectively correspond to the first background intensity waveform signals BG11~BG16, and the intensities of the first detecting light L1 from high to low respectively correspond to the first signals S11~S16. The first threshold intensity waveform signal G1 in step C100 is the signal with the intensity which is, for example, half the signal intensity of the first background intensity waveform signal BG1. In step C140, an object OB (such as user's finger) approaches or touches the base plane SP at a first position P1 (corner C2 in FIG. 1) during the calibration, and the intensity of the first signal S1 is used to determine whether the intensity of the first signal S1 is lower than the first background intensity waveform signal BG1 generated at the same time. If no, then the intensity of the first detecting light L1 is continuously decreased until a portion of the intensity of the first signal S16 (shown in FIG. 9A) is lower than half the first background intensity waveform signal BG1, which is the first threshold intensity waveform signal G1. Then the intensity of the first detecting light L1 is defined as the first calibrated intensity. Therefore, the intensity of the first detecting light L1 is set as the intensity suitable for detecting the object OB near to the light emitting unit 120, and the intensity of the first detecting light can be used for precisely detecting the position of the object OB with respect to the base plane SP.

Next, referring to FIGS. 9B and 11, the calibration method further includes providing the second detecting light L2 by the light emitting module 120 in step C210. In step C220, when the object OB is distant from the base plane SP, the second signal L2 generated by the image detecting module 130 is regarded a second background intensity waveform signal BG2. In step C230, a second threshold intensity waveform signal G2 is generated according to the second background intensity waveform signal BG2, where the signal intensity of the second threshold intensity waveform signal G2 is lower than the signal intensity of the second background intensity waveform signal BG2. In step C240, causing an object OB to approach or to touch the base plane SP at a second position P2, and whether there is a portion of the signal intensity of the second signal S2 generated by the image detecting module 130 lower than the second threshold intensity waveform signal G2 is determined. It should be noticed that, the distance between the second position P2 and the light emitting module 120 is larger than the distance between the first position P1 and the light emitting module 120. If the determination result of the step C240 shows that there is a portion of the signal intensities of the second signal S2 lower than the second threshold intensity waveform signal G2, then the intensity of the second detecting light L2 is defined as a second calibrated intensity in step C250. However, if the determination result of the step C240 shows that there is no portion of the signal intensities of the second signal S2 higher than the second threshold intensity waveform signal G2, the intensity of the second detecting light L2 is increased in step C260, and then the steps C220~C240 are repeated until the determination result in step C240 shows that there is a portion of the signal intensities of the second signal S2 lower than the second threshold intensity waveform signal G2, wherein when the determination result in step C240 shows that there is a portion of the signal intensities of the second signal S2 lower than the second threshold intensity waveform signal G2, the intensity of the second detecting light L2 is defined as the second calibrated intensity. The steps are similar to the previous steps C100~C160. The similarity is not repeated herein. However, the difference is that, the distance between the second position P2 and the light emitting unit 120 is relatively farther than the distance between the first position P1 and the light emitting unit 120. As the result, the detecting light with higher intensity is required for detecting the position of the object OB. Referring to FIG. 11, the second signals S21~S23 are respectively corresponding to the second background intensity waveform signal BG21~BG23, and the intensities of the second detecting light L2 from high to low respectively correspond to the second signal S21~S23. The intensity of the second detecting light L2 is increased from the low intensity until there is a portion of the intensity of the second signal S23 shown in FIG. 10 lower than the second background intensity waveform signal BG2, which is also the second threshold intensity waveform signal G2. Then, the intensity of the second detecting light L2 is defined as the second calibrated intensity. Therefore, the intensity of the second detecting light L2 is set as the intensity suitable for detecting the object OB far away from the light emitting unit 120, and at this time the intensity of the second detecting light L2 is higher than the intensity of the first detecting light L1. Thus, the calibrated intensity of the second detecting light L2 can be used for precisely detecting the position of the object OB with respect to the base plane SP. Specifically speaking, the first position P1 corresponds to an overexposure position on the image detecting module 130, and the second position P2 corresponds to a dark region position on the image detecting module 130. Moreover, the first position P1 is substantially the position which is nearest to the image detecting module 130 in the base plane SP, and the second position P2 is substantially the position which is farthest from the image detecting module 130 in the base plane SP. In other words, based on the above calibration method, the first detecting light L1 and the second detecting light L2 are respectively calibrated to have the intensity for detecting the object OB which is near to or away from the light emitting module 120 and the image detecting module 130, so that the accuracy of the touch detection is improved, and the probability of error detection is decreased.

For example, the intensity of the first detecting light L1 is gradually decreased from the maximum intensity provided by the light emitting module 120, and the intensity of the second detecting light L2 is gradually increased from the minimum intensity provided by the light emitting module 120. The first threshold intensity waveform signal G1 may be M times the first background intensity waveform signal, and the second threshold intensity waveform signal G2 may be N times the second background intensity waveform signal, wherein $0<M<0.5$, and $0<N<0.5$. However, the choices of ranges of M and N can be adjusted depending on practical requirement. For example, in other embodiments, the ranges of M and N can be set as, for example, $0<M<0.25$ and $0<N<0.25$, so that a qualified touch detection can be provided according to the practical requirement (such as user's habits, usage situation and affection of environmental brightness).

As the result, the M and N values are adjusted depending on the practical requirements (such as the surrounding environment, the size of the display desired for calibrating and user's habits) in accordance with the various applications.

Based on the above description, the optical touch system shown in the embodiments alternately provides the first detecting light and the second detecting light with different intensities to detect the position of the object on the base plane, so as to avoid detecting the position of the object in error when the object is too close to or too far away from the light emitting module. Further, the optical touch system may obtain a qualified accuracy of touch detection with fewer light emitting modules. That is to say, the quality of touch detection can still be maintained even when the manufacturing cost is lowered. The method of touch detection in the embodiment provides the first detecting light and the second detecting light with different intensities by turns to detect the position of the object on the base plane to avoid detection error and maintain the qualified accuracy on touch detection. The computer program product in the embodiment controls the first detecting light and the second detecting light, detects the reflected lights of the first detecting light and the second detecting light, and compares the signals thereof to determine the position of the object on the base plane. The method of calibration in the embodiment adjusts and sets the light intensity of the first detecting light and the second detecting light, which may be adapted to the optical touch system, so as to improve the accuracy of touch detection.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An optical touch system, configured to determine an action of an object approaching or touching a base plane, the optical touch system comprising:
a reflecting unit, disposed beside the base plane;
at least one light emitting module, disposed beside the base plane, the light emitting module providing a first detecting light and a second detecting light with different illumination intensities by turns, the first detecting light and the second detecting light being transmitted to the reflecting unit through a front of the base plane where the action of the object occurs;
at least one image detecting module, disposed beside the base plane, the reflecting unit reflecting the first detecting light and the second detecting light and causing the first detecting light and the second detecting light to be transmitted to the image detecting module through the front of the base plane, the image detecting module generating a first signal corresponding to the first detecting light and a second signal corresponding to the second detecting light, wherein when the object approaches or touches the base plane, at least a portion of the first detecting light and at least a portion of the second detecting light are obstructed by the object; and
a processing unit, determining a position of the object with respect to the base plane according to the first signal and the second signal,
wherein the light emitting module and the image detecting module are disposed jointly beside the base plane,
wherein the light emitting module comprises a first light source and a second light source, and the first light source and the second light source are turned on to respectively provide the first detecting light and the second detecting light,
wherein when the object is distant from the base plane, the image detecting module generates a first background signal corresponding to the first detecting light and a second background signal corresponding to the second detecting light, the processing unit calculates a difference between the first background signal and the first signal to obtain a first characteristic signal, the processing unit calculates a difference between the second background signal and the second signal to obtain a second characteristic signal, the processing unit determines whether the first characteristic signal and the second characteristic signal conform with a predetermined condition, and when the first characteristic signal and the second characteristic signal conform with the predetermined condition, the processing unit determines that the object approaching or touching the base plane.

2. The optical touch system as claimed in claim 1, wherein the processing unit generates a processing signal related to the first signal and the second signal, and the processing signal determines the position of the object with respect to the base plane according to the processing signal.

3. The optical touch system as claimed in claim 1, wherein the processing unit obtains a processing signal by adding the first characteristic signal with the second characteristic signal, the processing unit determines whether the processing signal conforms with the predetermined condition, and when the processing signal conforms with the predetermined condition, the processing unit determines that the object approaching or touching the base plane.

4. The optical touch system as claimed in claim 3, wherein the processing unit determines whether at least a portion of intensities represented by the processing signal exceeds a predetermined range, and when at least the portion of the intensities represented by the processing signal exceeds the predetermined range, the processing unit determines that the object approaching or touching the base plane, and the processing unit determines the position of the object with respect to the base plane according to a position on the image detecting module corresponding to the portion of the intensities represented by the processing signal exceeding the predetermined range.

5. The optical touch system as claimed in claim 1, wherein the processing unit coordinates times of providing the first detecting light and the second detecting light by the light emitting module respectively with times of generating the first signal and the second signal by the image detecting module.

6. The optical touch system as claimed in claim 1, wherein the at least one light emitting module is a plurality of the light emitting modules, the at least one image detecting module is a plurality of the image detecting modules, each of the light emitting modules correspondingly form an optical module with one of the image detecting modules, the processing unit employs a triangulation method for processing the first signals and the second signals from the optical modules to obtain a two-dimensional coordinate of the object with respect of the base plane.

7. The optical touch system as claimed in claim 1, wherein the optical touch system further comprises a display apparatus, and a display surface of the display apparatus is the base plane.

8. A method of touch detection, configured to determine an action of an object approaching or touching a base plane, the method of touch detection comprising:
providing at least one first detecting light and at least one second detecting light with different illumination intensities by turns and causing the first detecting light and the second detecting light to be transmitted through a front of the base plane where the action of the object occurs;
reflecting the first detecting light and the second detecting light transmitted through the front of the base plane and causing the first detecting light and the second detecting light to be transmitted in the front of the base plane;
detecting the reflected first detecting light and the reflected second detecting light and generating a first signal corresponding to the first detecting light and a second signal corresponding to the second detecting light, wherein when the object approaches or touches the base plane, at least a portion of the first detecting light and at least a portion of the second detecting light are obstructed by the object;
determining a position of the object with respect to the base plane according to the first signal and the second signal,
wherein a first light source and a second light source are turned on to respectively provide the first detecting light and the second detecting light; and
when the object is distant from the base plane, generating a first background signal corresponding to the first detecting light and a second background signal corresponding to the second detecting light,
wherein the step of determining the position of the object with respect to the base plane according to the first signal and the second signal comprises:
calculating a difference between the first background signal and the first signal to obtain a first characteristic signal;

calculating a difference between the second background signal and the second signal to obtain a second characteristic signal; and determining whether the first characteristic signal and the second characteristic signal conform with a predetermined condition, wherein when the first characteristic signal and the second characteristic signal conform with the predetermined condition, the object is determined to be approaching or touching the base plane.

9. The method of touch detection as claimed in claim 8, wherein the step of determining the position of the object with respect to the base plane according to the first signal and the second signal comprises:

generating a processing signal related to the first signal and the second signal; and determining the. position of the object with respect to the base plane according to the processing signal.

10. The method of touch detection as claimed in claim 8, wherein the step of determining whether the first characteristic signal and the second characteristic signal conform to the predetermined condition comprises:

obtaining a processing signal by adding the first characteristic signal with the second characteristic signal; and determining whether the processing signal conforms with the predetermined condition, wherein when the processing signal conforms with the predetermined condition, the object is determined to be approaching or touching the base plane.

11. The method of touch detection as claimed in claim 10, wherein the step of determining whether the processing signal conforms with the predetermined condition comprises determining whether at least a portion of intensities represented by the processing signal exceeds a predetermined range, and when at least the portion of the intensities represented by the processing signal exceeds the predetermined range, the object is determined to be approaching or touching the base plane, and the step of determining the position of the object with respect to the base plane according to the first signal and the second signal further comprises:

determining the position of the object with respect to the base plane according to a position of the image detecting module corresponding to the portion of the intensities represented by the processing signal exceeding the predetermined range.

12. The method of touch detection as claimed in claim 8, further comprising:

coordinating times of providing the first detecting light and the second detecting light respectively with times of generating the first signal and the second signal.

13. The method of touch detection as claimed in claim 8, wherein the at least one first detecting light is a plurality of the first detecting lights, the at least one second detecting light is a plurality of the second detecting lights, and the method of touch detection further comprises:

employing a triangulation method for processing the first signals corresponding to the first detecting lights and the second signals corresponding to the second detecting lights to obtain a two-dimensional coordinate of the object with respect to the base plane.

14. A computer program product in a non-transitory computer readable medium adapted by an optical touch system for determining an action of an object approaching or touching a base plane, the computer program product comprising:

first instructions for providing at least one first detecting light and at least one second detecting light with different illumination intensities by turns by at least one light emitting module, wherein the first detecting light and the second detecting light are transmitted to a reflecting unit through a front of the base plane where the action of the object occurs, and the first detecting light and the second detecting light are reflected and then transmitted in the front of the base plane by the reflecting unit;

second instructions for detecting the reflected first detecting light and the reflected second detecting light and generating a first signal corresponding to the first detecting light and a second signal corresponding to the second detecting light by at least one image detecting module, wherein the light emitting module and the image detecting module are disposed jointly beside the base plane, and when the object approaches or touches the base plane, at least a portion of the first detecting light and at least a portion of the second detecting light are obstructed by the object;

third instructions for determining a position of the object with respect to the base plane according to the first signal and the second signal by a processing unit, wherein the light emitting module comprises a first light source and a second light source, and the first light source and the second light source are turned on to respectively provide the first detecting light and the second detecting light; and instructions for generating a first background signal corresponding to the first detecting light and a second background signal corresponding to the second detecting light when the object is distant from the base plane;

wherein the third instructions comprise:

instructions for calculating a difference between the first background signal and the first signal to obtain a first characteristic signal;

instructions for calculating a difference between the second background signal and the second signal to obtain a second characteristic signal; and instructions for determining whether the first characteristic signal and the second characteristic signal conform with a predetermined condition, wherein when the first characteristic signal and the second characteristic signal conform with the predetermined condition, the object is determined to be approaching or touching the base plane.

15. The computer program product as claimed in claim 14, wherein the third instructions comprise:

instructions for generating a processing signal related to the first signal and the second signal; and instructions for determining the position of the object with respect to the base plane according to the processing signal.

16. The computer program product as claimed in claim 14, wherein the instructions for determining whether the first characteristic signal and the second characteristic signal conform to the predetermined condition comprise:

instructions for obtaining a processing signal by adding the first characteristic signal with the second characteristic signal; and instructions for determining whether the processing signal conforms with the predetermined condition, wherein when the processing signal conforms with the predetermined condition, the object is determined to be approaching or touching the base plane.

17. The computer program product as claimed in claim 16, wherein the instructions for determining whether the processing signal conforms with the predetermined condition comprise instructions for determining whether at least a portion of intensities represented by the processing signal exceeds an predetermined range, and when at least the portion of the intensities of the processing signal exceeds the predetermined range, the object is determined to be approaching or touching the base plane, and the third instructions further comprise:

instructions for determining the position of the object with respect to the base plane according to a position on the image detecting module corresponding to the portion of the intensities represented by the processing signal exceeding the predetermined range.

18. The computer program product as claimed in claim 14, further comprising instructions for coordinating times of providing the first detecting light and the second detecting light respectively with times of generating the first signal and the second signal.

19. The computer program product as claimed in claim 14, wherein the at least one first detecting light is a plurality of the first detecting lights, the at least one second detecting light is a plurality of the second detecting lights, and the computer program product further comprises:

instructions for employing a triangulation method for processing the first signals corresponding to the first detecting lights and the second signals corresponding to the second detecting lights to obtain a two-dimensional coordinate of the object with respect to the base plane.

\* \* \* \* \*